UNITED STATES PATENT OFFICE.

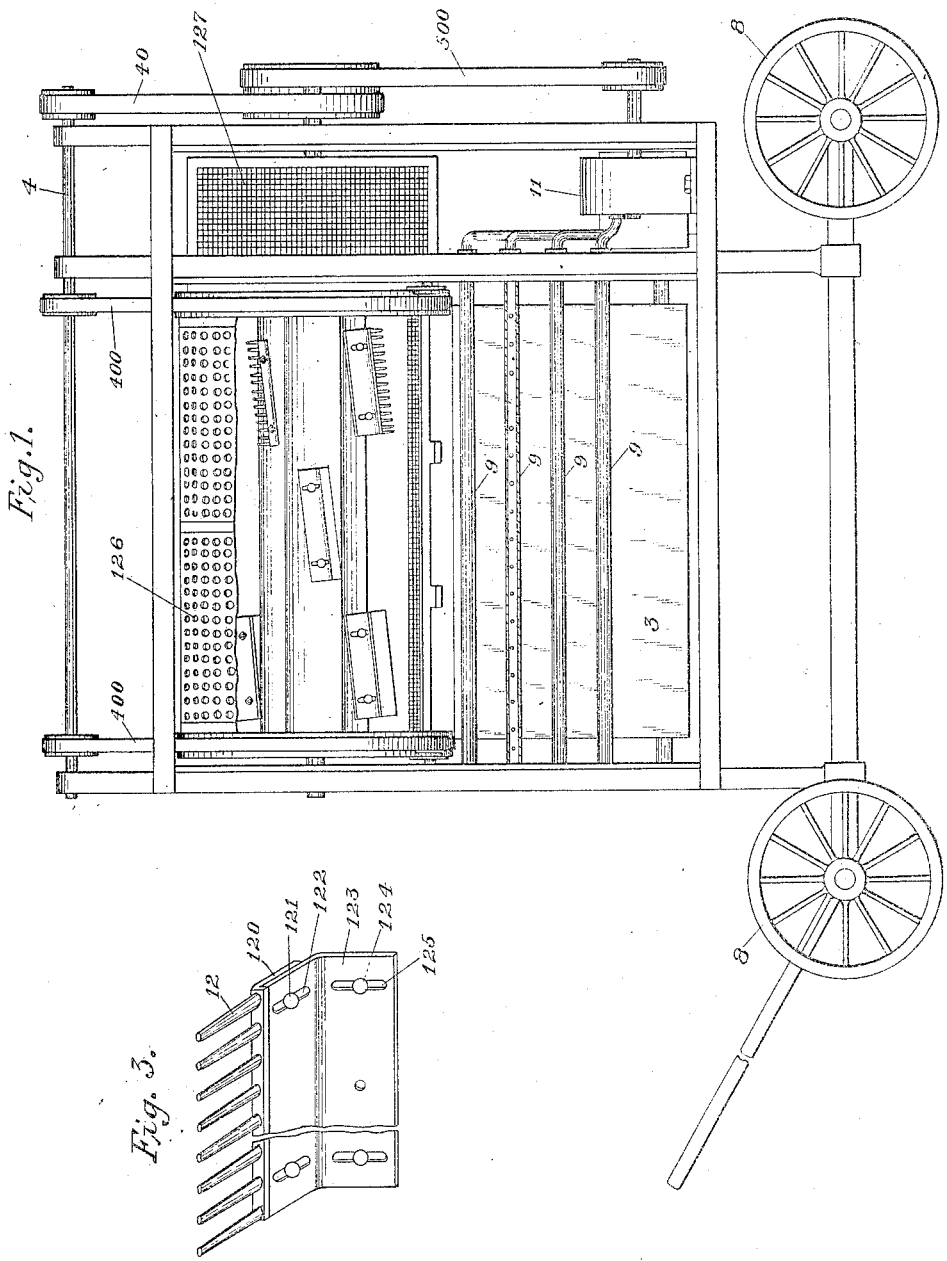

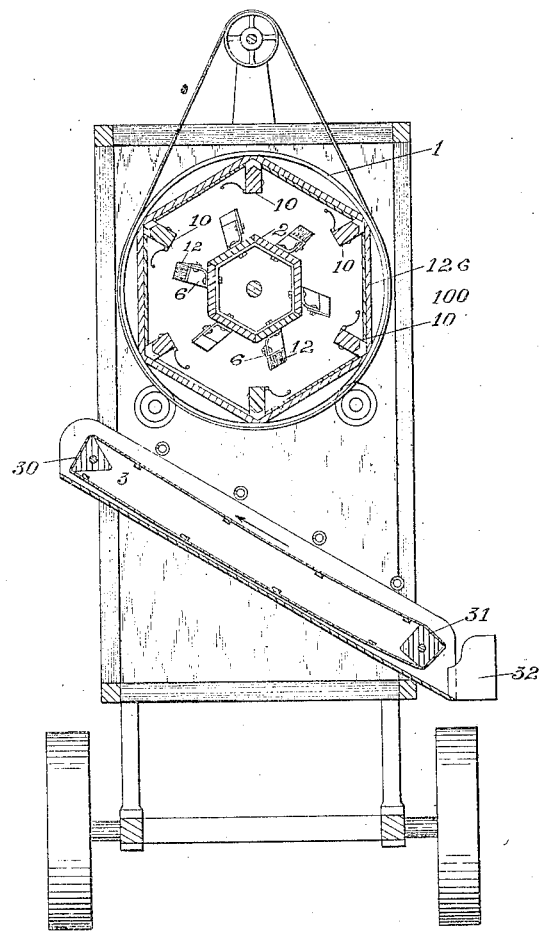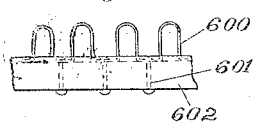

ROBERT P. SCOTT, OF CADIZ, OHIO.

MACHINE FOR HULLING PEAS, BEANS, AND THE LIKE.

1,072,176. Specification of Letters Patent. Patented Sept. 2, 1913.

Application filed May 14, 1913. Serial No. 767,556.

*To all whom it may concern:*

Be it known that I, ROBERT P. SCOTT, a citizen of the United States, residing at Cadiz, Harrison-county, Ohio, have invented certain new and useful Improvements in Machines for Hulling Peas, Beans, and the Like, of which the following is a specification.

My invention relates to machines for hulling cow peas, Lima beans and certain varieties of green peas from the vines, and is an improvement on the impact type of machine such as is indicated in my former Patents No. 499,397 of June 13, 1893, to R. P. Scott, No. 957,442, May 10, 1910, to R. P. Scott, No. 957,443, May 10, 1910, to R. P. Scott, No. 500,299, June 27, 1893, to Scott and Chisholm and my co-pending application, Serial No. 759,387 of April 4, 1913.
The object of my invention is to improve on machines already in use and particularly to make one machine applicable to cow peas and Lima beans and also to the more resistant varieties of green peas.
My invention consists in the application of a special beater and in combining therewith sifting and fanning elements all working together for the purpose indicated hereinafter.
In the drawings: Figure 1 is a front elevation of the machine with parts broken away, Fig. 2 is a vertical transverse section. Fig. 3 is a perspective view of the finger beater mounted so as to have a springy action. Fig. 4 is a view of another form of finger beater, and Fig. 5 is a more or less diagrammatic view illustrating the action of the fingers in hulling cow peas, or a more resistant varieties of peas.
While machines using the impact process have been in use for the past twenty years, mostly on green peas for canning purposes, of late Lima beans have come more in demand and there has been little success in hulling cow peas, which latter are a variety of the bean family.

In operating on cow peas, fanning facilities are much needed and a much more drastic style of beater is preferred. This is also true of Lima beans.

Referring now to the drawing, Fig. 1 shows the elevation of my huller which in general form resembles the impact machines shown in my former patents and applications with additional features as hereinafter described.

An outer elevating cylinder 1 with longitudinal lifting ribs 10 is provided in which is mounted an inner beater-carrying drum 2 with radial beaters 6. One or more of said beaters is provided with teeth 12. The power from the engine is generally applied to the central shaft of the drum 2 and a counter shaft 4 is connected by a belt or sprocket chain 40 to the shaft of the drum 2. This counter shaft in turn drives the outer cylinder 1 by means of belts 400 and also drives the apron by suitable connections not shown. The blower 11 may be driven directly from the inner beater shaft by means of a belt 500, or the blower may be run independently from an engine used to drive the machine. The blower 11 forces air through the pipes 9, one or more of such pipes being arranged above the apron 3 and being provided with holes or slots from which currents of air are directed upwardly and substantially parallel to the surface of the separating apron 3.

In order to transport the machine from place to place, it is mounted upon a truck provided with wheels 8. This avoids the disadvantage of stationary pea hullers which could not be moved, except by tearing them down.

In the machine illustrated in the drawings, a driving engine may be used, which is separate from the huller, or which may be placed upon a suitable truck with a driving connection to the truck wheels so as to carry the entire apparatus from place to place. The engine may be of the automobile type and useful for other purposes.

It is not my intention to do away with the impact process in hulling peas, but to introduce a breaking action where the impact fails to open the pod. It is not so much my object to tear the vines apart as it is to strike the pea pods by a blow calculated to break the pods in two, as shown in Fig. 5.

In some varieties of peas where the pods are very closely filled, very little air is found inside. When it is possible to do the hulling purely by impact against a flat unbroken surface, the action is less harsh on the peas. But in some varieties and particularly with Lima beans, a breaking action is necessary. I therefore do not generally use my finger beaters throughout the entire hulling machine, but make use of a plain, flat impact beater at the start, and my finger beater at the tail or discharge end.

In the present application, I have shown a spring beater, which broadly considered constitutes one of the subjects of my copending application above referred to. In the present instance, however, the spring device is combined with a finger beater, there being a special advantage in utilizing a springy action when a finger beater is used. This is for the reason that fingers are rather more harsh on the peas than a flat surface at the same speed, so that by utilizing a mild spring stroke with fingers, the harshness is modified. Moreover, a slightly slower speed can be used with the spring beater if it is provided with fingers. It will be understood, however, that the finger beater may be used without the springy action, if desired.

Fig. 5 shows the action of the fingers 12 in hulling and breaking the pod of the more resistant variety of peas, hulled by the machine.

Instead of making the fingers of cast metal or as indicated in Fig. 3, the construction shown in Fig. 4 may be used. In this figure a corrugated face takes the place of the fingers. The corrugation may be made by bending up the sheet of metal 600, which is then fastened by means of bolts 601 to the support 602, which support is bolted to the drum. The corrugations may also be grooved out of wood or metal. The fingers may also be made longer and of flexible material such as steel wire in which case there would be a certain amount of spring in the finger itself.

In the form of the invention shown in Fig. 3 which is the same as that shown in Fig. 1, the fingers are cast upon a plate 120, which is adjustably secured by means of bolts 121 and slots 122, upon the sheet metal angular support 123. The sheet metal is springy so that the fingers 12 give a yielding blow. The sheet metal piece 123 is secured to the drum 2 by means of bolts 124 and slots 125, so that the angle of the beaters with respect to the drum 2 may be adjustably varied. By means of the bolts 121, the radial length of the beaters may be varied.

The outer cylinder 1 is constructed as shown in my co-pending application, with perforated rubber screen 126 and carries the lifting ribs 10 provided with guards 100 and with passages 101 between the ribs and the perforated rubber, so that such of the hulled peas as pass between the guard 100 and the rubber run through the passage 101 onto the adjacent face of the cylinder. The outer cylinder is provided at the discharge end with a coarser wire screen 127 for sifting the peas or beans that remain over in the exit end of the machine.

My machine is useful as a pea huller for hulling peas of the more resisting varieties and for hulling Lima beans and cow peas and may readily be converted into a machine for hulling tender green peas by removing the finger beaters and substituting suitable plain faced beaters therefor, and adjusting them to the desired angle. By such a substitution it is also possible to change the machine from one that is used in hulling beans of one kind to a machine for hulling beans of another kind, or of a different condition during the season.

The apron 3 as usual is provided with the three cornered roller 30 and the four-cornered roller 31 to give the desired shape to the upper portion of the apron. It is driven so that the upper portion moves upwardly, namely, toward the left as indicated by the arrow in Fig. 2, carrying with it the shred of the vines, pods, etc., the peas rolling downwardly into the box 32. This action of separating the peas from the shreds is greatly facilitated by the blast of air coming from the pipes 9, which blows the shreds upwardly.

Having thus described the construction of my machine, its operation will be clear. The beans or cow peas, etc., are fed into the machine at the left hand end of Fig. 1 and pass through the machine, being sifted in the process from the perforated rubber screens 126 and the coarser wire screen 127 at the exit end of the machine. The beaters with their fingers 12 open the pods and break them if resistant. The blasts of air coming from the pipes 9 prevent the shreds from the pods of cow peas from passing into the box with the hulled peas.

What I claim is:

1. In a vine hulling machine for hulling peas, beans and the like by impact, the combination of a revolving shaft, a beater provided with a series of fingers carried by the shaft and lifting ribs to elevate the peas, beans and the like and drop them into the path of the beater.

2. In a vine hulling machine for hulling peas, beans and the like by impact, the combination of a shaft, a springy beater carried thereby, said beater being provided with a series of fingers and rotary lifting ribs for elevating the peas, beans and the like and discharging them into the path of the beaters.

3. In a vine hulling machine for hulling peas, beans and the like by impact, the combination of a rotating cylinder having a perforated outer wall, means for hulling peas within said cylinder and means for directing a blast of air beneath said cylinder across the path of the shreds so as to divert the shreds descending through said cylinder.

4. In a vine hulling machine for hulling peas, beans and the like, the combination of a drum carrying one or more springy beaters, one or more of said beaters being provided with radially projecting fingers, a cylinder covered with perforated material for sifting the hulled products, elevating mechanism for raising the vines and dropping them into the path of the beaters and means for forcing a blast of air transversely of the path of the descending shreds which pass through the perforated cylinder.

5. In a pea and bean huller, the combination of hulling, sifting and separating devices, consisting of a drum carrying a plurality of springy beaters, each provided with radial fingers, a cylinder covered with perforated material, elevating ribs within the cylinder for elevating the products and dropping them into the path of the beaters, a separating apron arranged beneath the cylinder and a plurality of pipes extending across and above the said apron and provided with passages so as to project blasts of air upwardly and substantially parallel to the upper flap of the apron and across the path of the descending shreds.

In testimony whereof, I have signed my name to this specification, in the presence of two subscribing witnesses.

ROBERT P. SCOTT.

Witnesses:
   FREDERIC KUNZ,
   LONELLA F. LITTLE.